Figure 1:
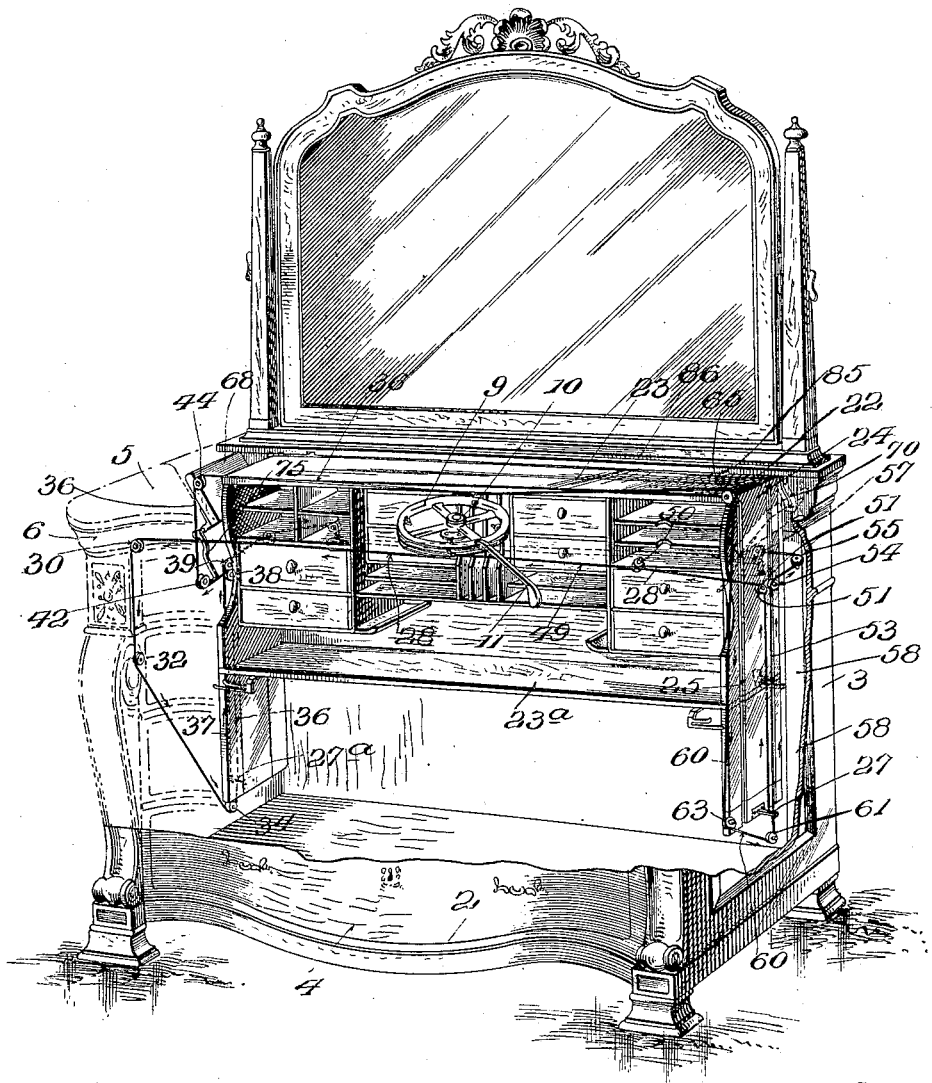

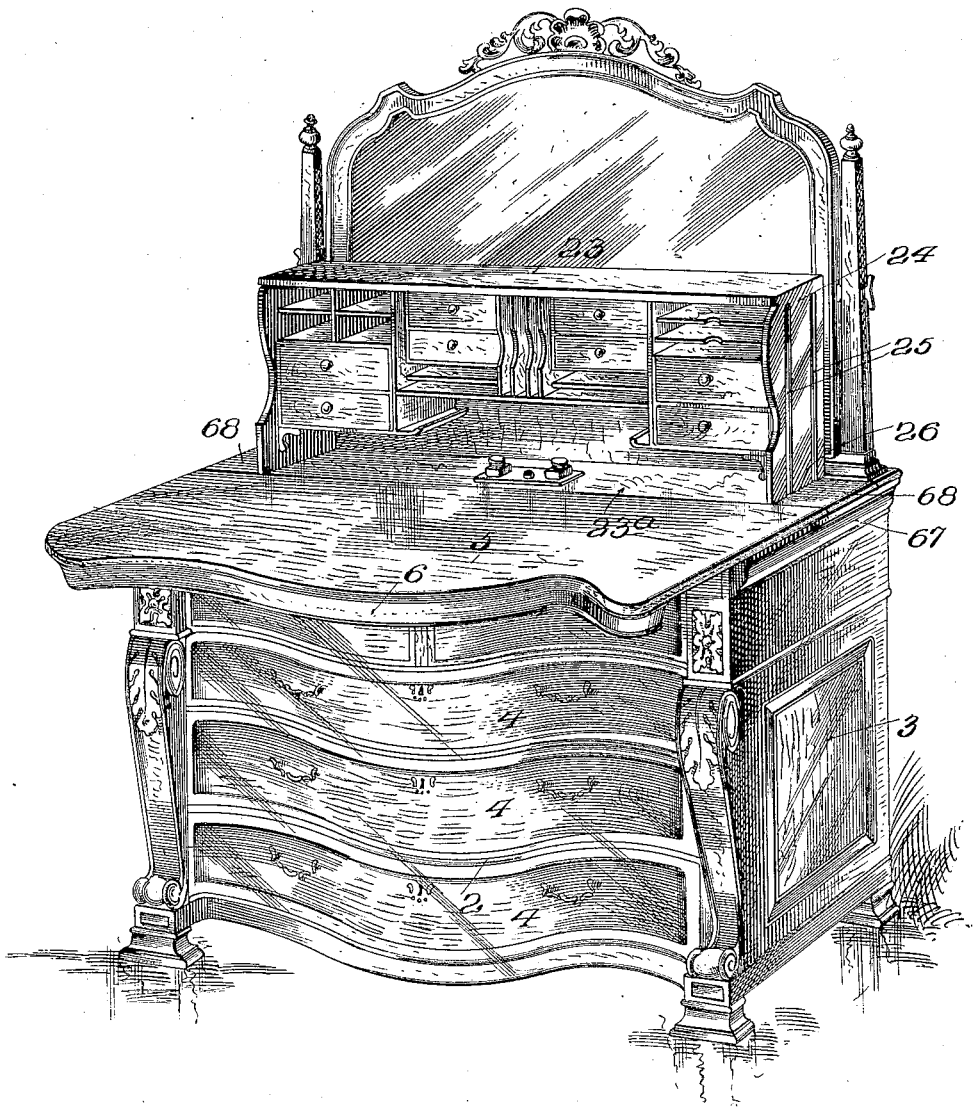

M. H. STUEWE.
CONVERTIBLE FURNITURE.
APPLICATION FILED MAR. 12, 1913.
1,138,997.
Patented May 11, 1915.
7 SHEETS—SHEET 3.
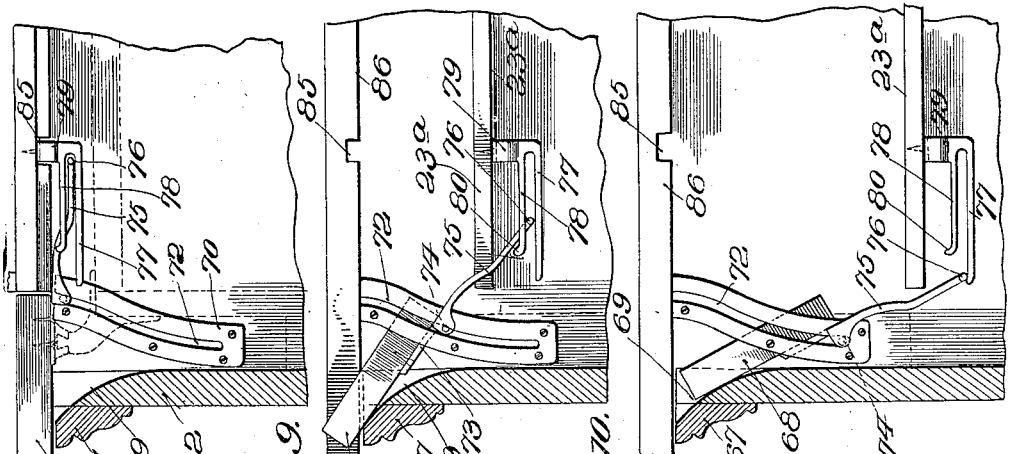
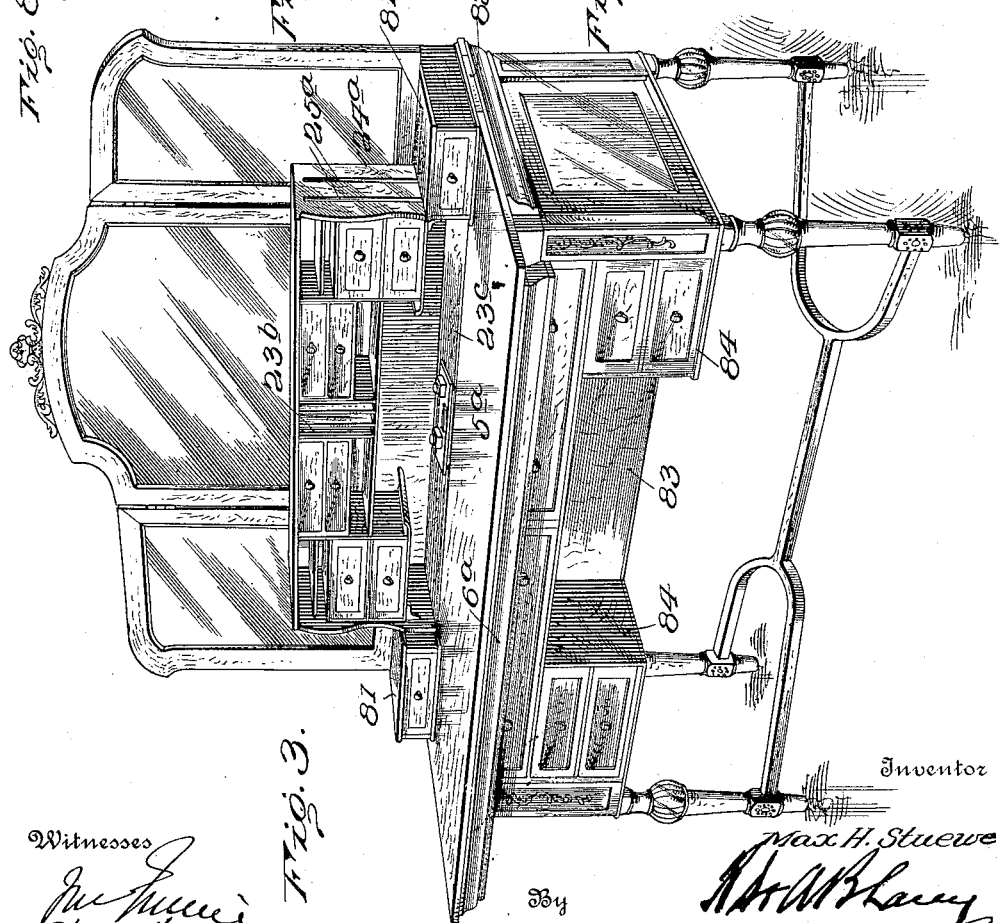

M. H. STUEWE.
CONVERTIBLE FURNITURE.
APPLICATION FILED MAR. 12, 1913.
1,138,997.
Patented May 11, 1915.
7 SHEETS—SHEET 4.
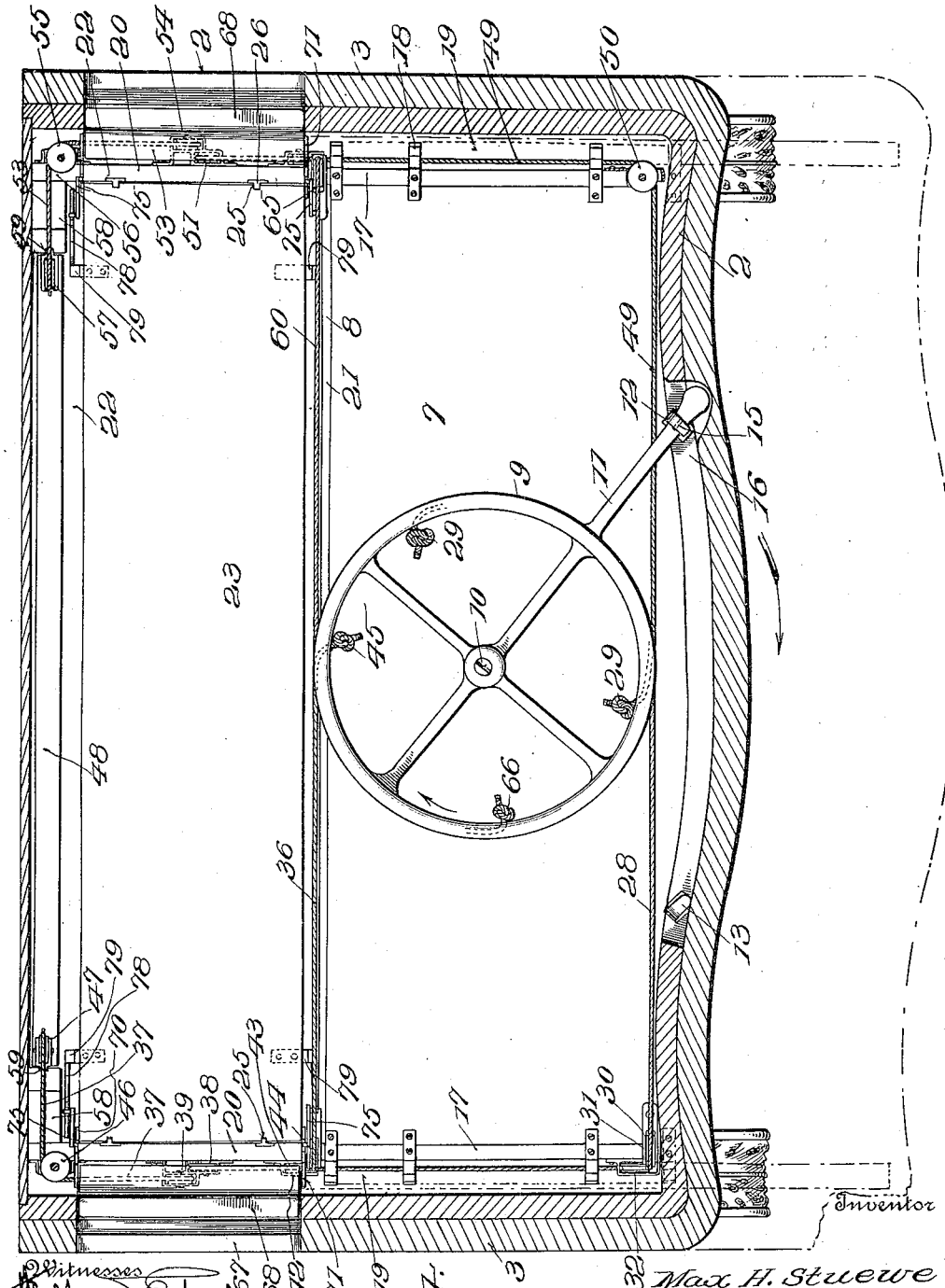

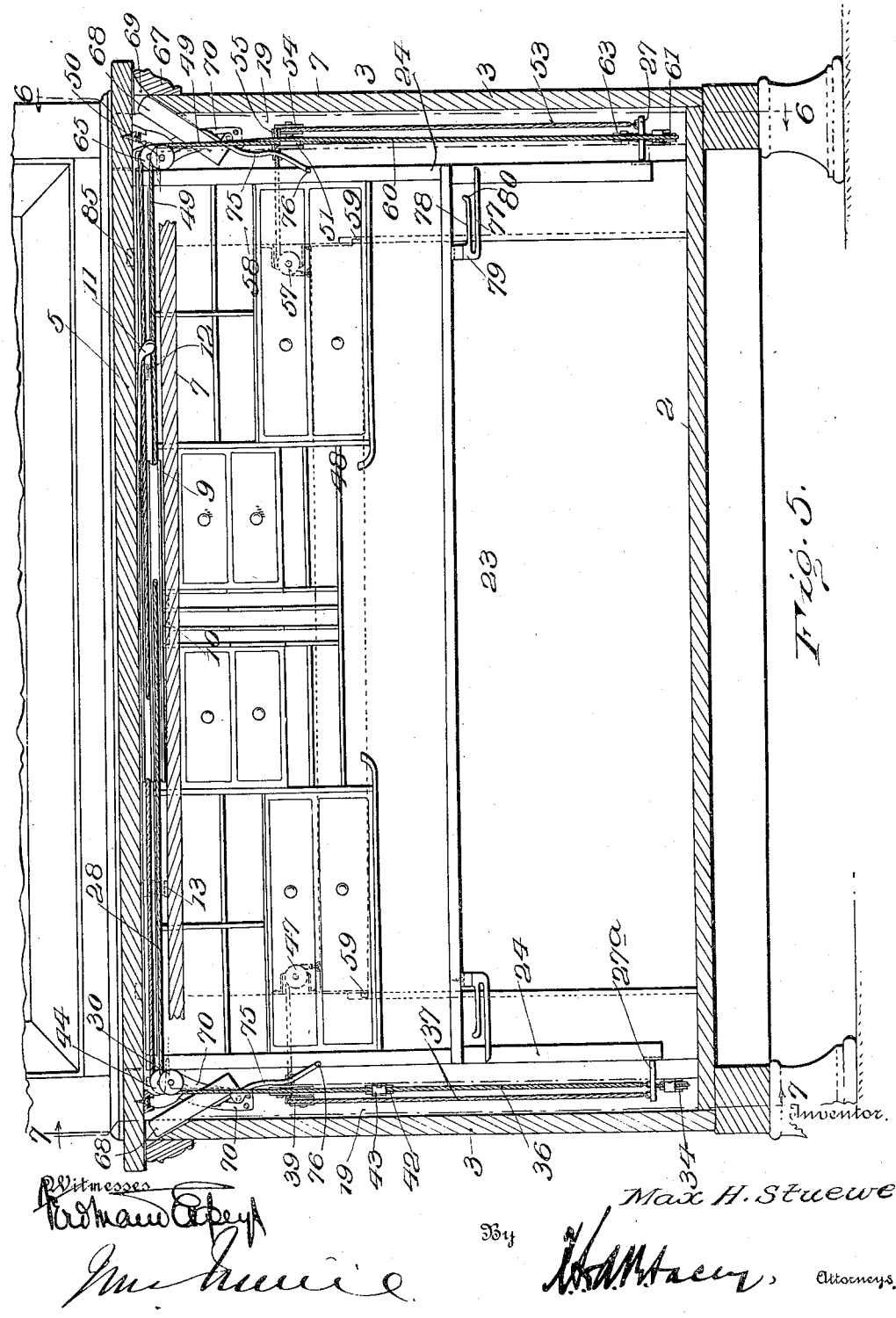

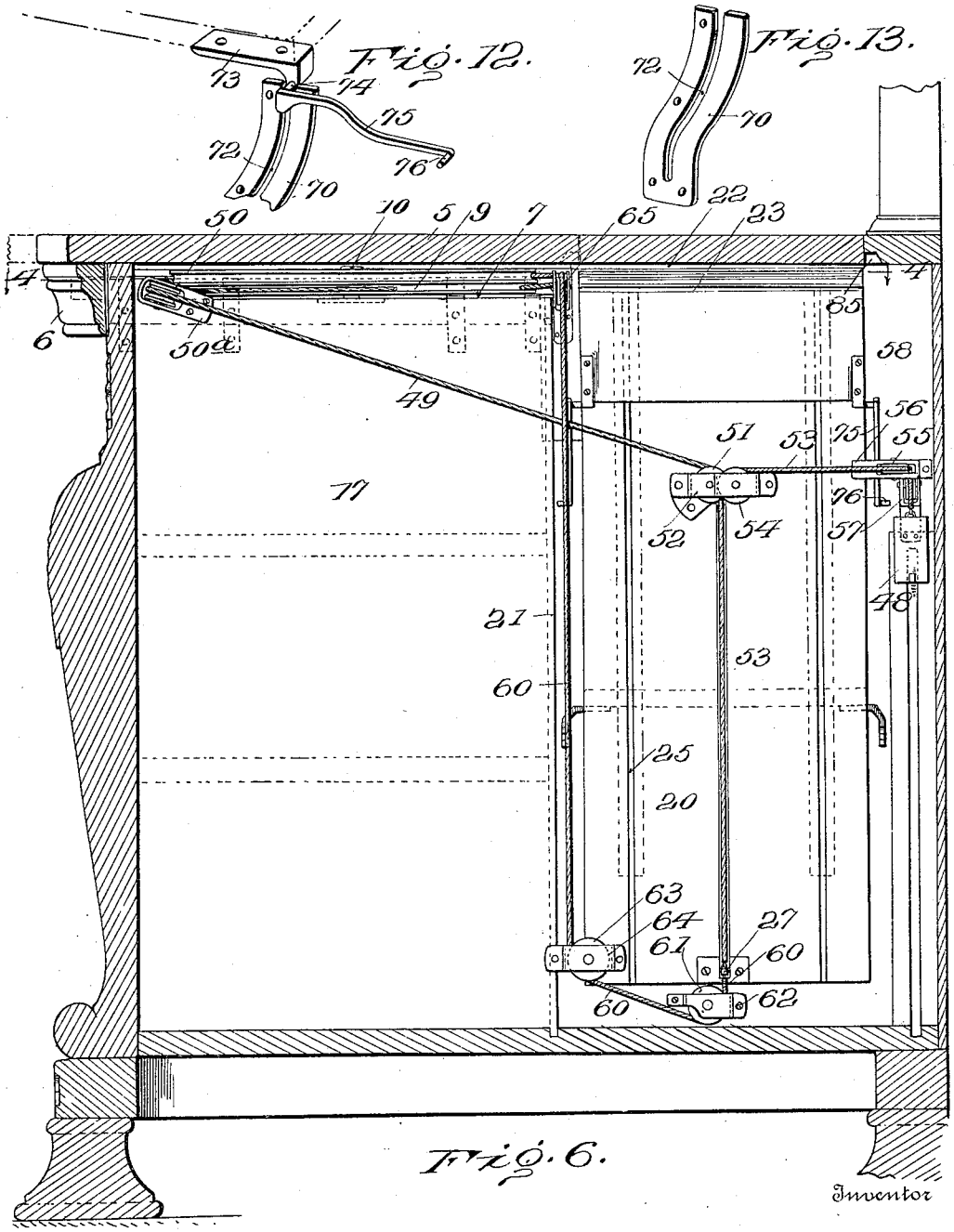

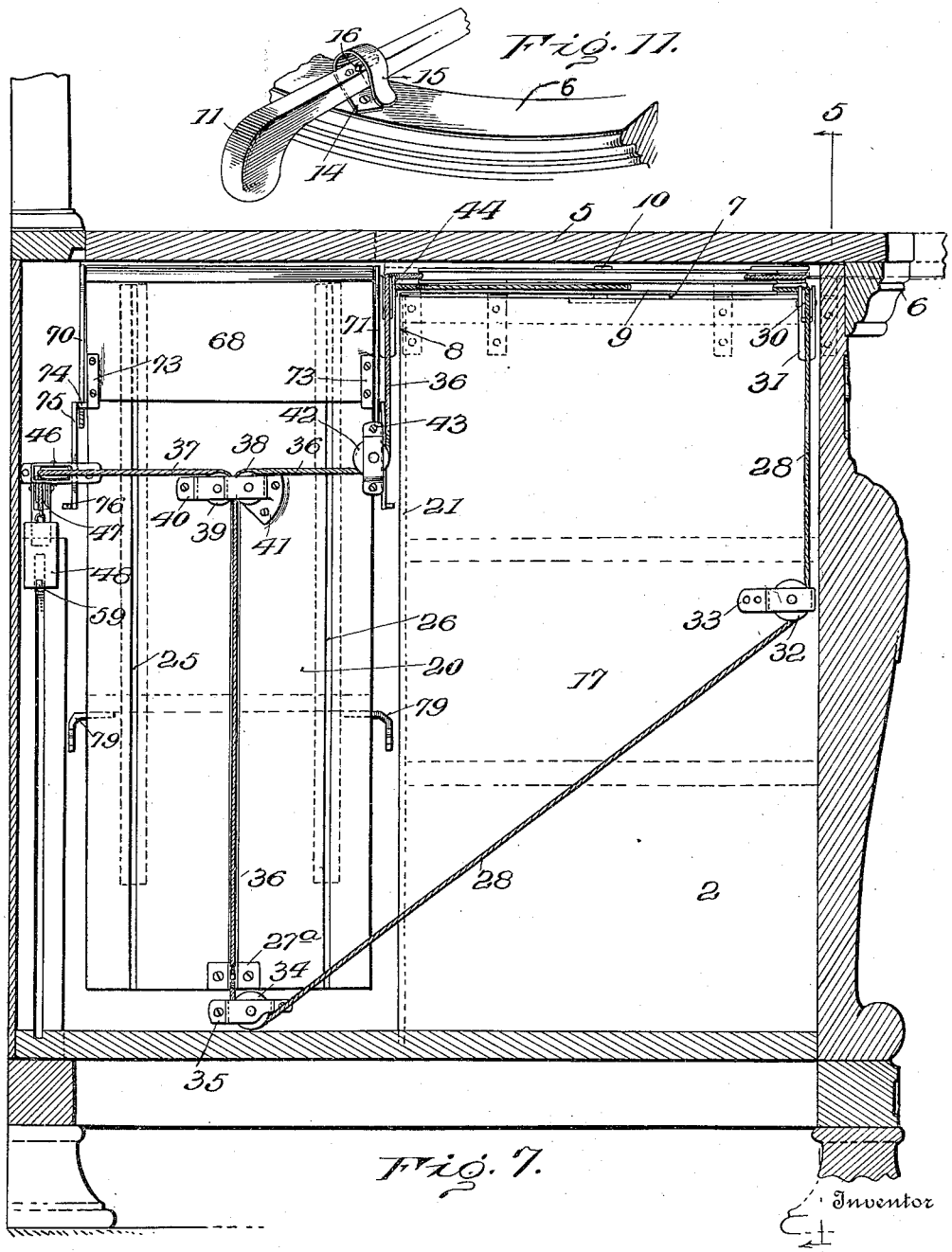

UNITED STATES PATENT OFFICE.

MAX H. STUEWE, OF HOLLYWOOD, CALIFORNIA.

CONVERTIBLE FURNITURE.

1,138,997.   Specification of Letters Patent.   Patented May 11, 1915.

Application filed March 12, 1913. Serial No. 753,879.

*To all whom it may concern:*

Be it known that I, MAX H. STUEWE, citizen of the United States, residing at Hollywood, in the county of Los Angeles and State of California, have invented certain new and useful Improvements in Convertible Furniture, of which the following is a specification.

My invention relates to furniture, and particularly to articles of furniture which are convertible from one use to another.

The object of my invention is to provide a combined desk and bureau, chiffonnier or dresser, and to provide in this connection a bureau or dresser which contains within it a concealed cabinet, which by the manipulation of proper instrumentalities may be brought into an exposed position so that the bureau, dresser or like article may be put to use as a desk.

A further object of my invention is the provision of an article of this character which when it is closed does not show in any manner that it is convertible into a desk.

A further object is to provide in connection with a bureau, dresser or like article, a sliding top which may be shifted outward so as to form the top of the desk projected beyond the top of the dresser so as to accommodate the legs of the user, and to provide means for raising a pigeonhole cabinet normally contained in the body of the dresser or bureau up into a projected position.

A further object is to provide positive means for raising or lowering the pigeonhole cabinet out of and into the body of the dresser and provide counterweighting means whereby the weight of the cabinet will be counteracted.

A still further object is the provision of means whereby when the top of the dresser has been pulled out and the cabinet projected, the space at the ends of the top between the rear edge of the top and the back of the dresser may be automatically filled.

Other objects will appear in the course of the following description.

My invention is illustrated in the accompanying drawings wherein:

Figure 1 is a perspective view of a bureau constructed in accordance with my invention, the outer casing of the bureau and the drawers being broken away so as to show the interior construction. Fig. 2 is a perspective view of the bureau illustrated in Fig. 1 and showing the cabinet projected. Fig. 3 is a perspective view of another form of dresser constructed in accordance with my invention and showing a modification of the construction illustrated in Figs. 1 and 2. Fig. 4 is a top plan view of the bureau illustrated in Figs. 1 and 2 with the top removed, the position of the top being shown in dotted lines, the section being taken on the line 4—4 of Fig. 6. Fig. 5 is a sectional view of the construction illustrated in Fig. 4 taken on the line 5—5 of Fig. 7. Fig. 6 is a sectional view on the line 6—6 of Fig. 5, illustrating the cabinet supporting connections at the left hand end of the bureau. Fig. 7 is a sectional view on the line 7—7 of Fig. 5 showing the construction at the right hand end of the bureau. Figs. 8, 9 and 10 are detail sectional views showing the various positions assumed by the filling pieces closing the ends of the bureau at each end of the pigeonhole. Fig. 11 is a detail fragmentary perspective view of a portion of the molding 6, one of the clips thereon and a portion of the handle. Fig. 12 is a fragmentary view of the means for actuating one of the filler pieces. Fig. 13 is a perspective detail view of the guide therefor.

Corresponding and like parts are referred to in the following description and indicated in all the views of the accompanying drawings by the same reference characters.

Two forms of my invention are illustrated in the drawings, both forms being operated on the same principle though differing in detail. Figs. 1 and 2 show the invention as applied to a bureau while Fig. 3 shows the invention as applied to a dresser. Referring first to the construction of the bureau illustrated in Figs. 1 and 2, it will be seen that the bureau has the usual body 2 having end panels 3 and a mirror supported at the rear of the body upon posts. The body is open at the front and provided with the usual drawers 4.

The top of the bureau is covered by a sliding top designated 5 and having at its forward edge a downwardly extending flange or molding 6. In the drawings this molding 6 is illustrated as being bowed or curved but it will be understood, of course, that it might be straight without affecting the principle of the invention though the molding is bowed not only to suit the bowed front of the bureau but also for the purpose of accommodating to some extent the wheel for raising and lowering the pigeonhole cabinet as will later appear.

Disposed beneath the sliding top 5 is a permanent top 7 which forms the top closure of the drawer compartment and which extends back beyond the middle transverse longitudinal plane of the bureau. The rear of this permanent top is designated 8 (see Fig. 4). Rotatably mounted upon this permanent top is a wheel 9 mounted upon a spindle or axis 10 projecting upward from the permanent top. This wheel is provided with a radially projecting handle 11 which is of such length that when the sliding top 5 is pushed inward in the position shown in Fig. 4, the handle will be entirely concealed. When the sliding top 5 is drawn out, however, the handle may be reached and manipulated by reaching up underneath the flange 6, and by shoving this handle in the direction of the arrow, Fig. 4, the wheel 9 will be rotated in the direction of the arrow.

A clip 12 is provided at one end of the arc of movement of the handle which will engage the handle to prevent any rotation of the wheel and a like clip 13 is mounted at the other end of the arc of movement of the handle for the same purpose. These clips are preferably resilient and as illustrated comprise a base 14 rebent upon itself to form an upper resilient jaw 15. The handle is provided with a lug 16 which will engage this upwardly extending jaw and force it open so that the clip will resiliently engage the handle when the handle is forced into the clip.

The wheel 9 as illustrated in Fig. 5, has an upper and a lower circumferential groove, and openings communicating from said grooves to the interior face of the wheel whereby a plurality of cords or other flexible connections may be attached to the wheel.

Disposed inward of the end panels 2 are the vertically extending partition walls 17, these partition walls being separated from the panel 2 so as to leave spaces 19 at either end of the article of furniture within which the cords for actuating the sliding pigeonhole cabinet are arranged as will be later stated. These walls 17 extend back as shown in Fig. 4 to the rear edge 8 of the top 7. Rearward of the top 7 there are rearwardly extending walls 20 which are in line with the wall 17 and spaced from the end panels 2. The rear of the drawer space beneath the top 7 is defined by a vertical partition 21. Rearward of the drawer space and of the vertical partition 21 is a space 22 within which the pigeonhole cabinet 23 moves. This pigeonhole cabinet as illustrated in Fig. 2 is approximately rectangular in form and the end walls 24 thereof are provided with longitudinal grooves 25 engaging with longitudinally disposed guiding ribs 26 formed on the inner faces of the partitions 20. The lower ends of the end pieces 24 are provided with rope clips 27.

Attached to the wheel 9 and disposed in one of the grooves of the wheel and passing through one of the openings therethrough is a cord or other flexible connection 28 which is knotted as at 29 or otherwise attached to the wheel 9. This flexible connection extends laterally toward the left hand end of the bureau and there passes over a pulley 30 which is mounted within a slot 31 formed in the partition wall 17 on that side. As seen from Fig. 7, the cord 28 then passes downward within the space 19 and over a pulley 32 which is mounted in a bracket 33 attached to the partition wall 17. After passing over the pulley 32, the cord 28 extends downward and rearward to the bottom of the pigeonhole cabinet compartment 22 and passes, as shown in Fig. 7, over a pulley 34 carried upon a bracket 35. The cord then extends upward and is attached to the clip 27ª which is the same as the clip 27 heretofore described and which is attached to the lower end of the pigeonhole cabinet end piece at its middle plane. Attached to this clip 27ª are two cords 36 and 37. These cords pass upward together and then pass in opposite directions over a pair of pulleys 38 and 39 mounted upon brackets 40 and 41 attached to the outer face of the partition 17. The cord 37 extends toward the rear of the bureau and is attached to a counterweight as will be later stated, while the cord 36 extends toward the front of the pigeonhole cabinet compartment and passes over a pulley 42 which is mounted in a bracket 43 attached to the inside face of the partition 20 as illustrated in Fig. 7. The cord 36 then passes upward toward the top of the desk and over a pulley 44 mounted upon the partition 17 at the upper end thereof. From thence the cord 36 passes horizontally toward the middle of the bureau in the space above the permanent top 7 thereof and enters one of the grooves of wheel 9, passes through the opening in the web thereof and is knotted as at 45. The cord 37 passes over the pulley 39 as previously stated, is carried rearward horizontally, as shown in Fig. 7, and then passes over a pulley 46 mounted upon the rear outside face of the partition 20. The cord extends inward horizontally, passes over a pulley 47 and is then connected to a counterweight 48 disposed at the rear of the bureau and rearward of the space within which the pigeonhole cabinet moves.

Extending in an opposite direction from wheel 9 with relation to the cord 28 is a cord or other flexible connection 49. This extends horizontally toward the right hand side of the bureau and passes over a pulley 50 which as shown in Fig. 6 is rearwardly and downwardly inclined and is mounted in a bracket 50ª attached to the inside face of the adjacent partition 17. From thence the cord 49 passes downwardly and rearwardly and at the middle plane of the pigeonhole cabinet compartment it passes over a pulley 51 mounted in a bracket 52 and then extends downward and is attached to the clip 27 as previously stated. Also attached to this clip 27 and extending upward therefrom parallel to the cord 49 is the cord 53 which corresponds to the cord 37 and extends rearwardly over a pulley 54 also mounted in the bracket 52 which is a double bracket. The cord or other flexible connection 53 passes rearward, then over a pulley 55 mounted in a bracket and disposed in a slot 56 cut in the rear of the partition 20, then passes horizontally as in Fig. 4 and over a pulley 57 and then is attached to the counterweight bar 48. The pulleys 47 and 57 are mounted upon the corner posts 58 which support the rear portion of the bureau.

It will be noted from Fig. 4 that the brackets 40 and 41 and the brackets 52 are double brackets so formed as to carry the two pulleys 38 and 39 or 51 and 54, and that these pulleys 38 and 39 or 51 and 54 are out of alinement with each other as clearly illustrated in Fig. 4 so as to permit the double cords, one leading to the wheel and the other to the weight, to have free movement without frictional engagement.

The weight 48 is preferably formed with lugs 59 which engage with tracks formed in or carried by the posts 58, thus to permit the counterweight to have a true vertical movement without any tendency to jam or rattle within the counterweight compartment.

Attached to the clip 27 as illustrated in Fig. 6 and extending downward therefrom is a cord 60 which extends downward over a pulley 61 mounted on the partition wall 20 by means of a bracket 62, and after passing around this pulley 61 this cord 60 passes upward and forward over a pulley 63 mounted in a bracket 64 upon the partition 20. After passing over this pulley 63, the cord 60 passes upward vertically to the top of the desk and then passes over a pulley 65 mounted either on the end of the partition 17 or the end of the partition 20, and after passing over this pulley 65, the cord 60 extends horizontally in line with the wheel 9 and is engaged with one of the grooves of the wheel, passes through an opening in the web of the wheel and is knotted as at 66 (see Fig. 4).

It will be seen that with the arrangement of cords heretofore described, when the wheel 9 is turned in a clockwise direction, that is, the direction of the arrow, Fig. 4, the cord 49 will be tightened while the cord 28 will be slackened. As the wheel is revolved, the cord 49 will be wrapped upon the wheel while the cord 28 will be held out. While the cord 28 is being let out and the cord 49 drawn up, the cord 36 will be wrapped upon the wheel 9 and the cord 60 will be let out. As a consequence, as the wheel 9 rotates in the direction of the arrow, Fig. 4, the cords 49 and 36 will act to draw upward on the pigeonhole cabinet 23 while the cords 28 and 60 will be let out a sufficient amount to accommodate this upward movement of the cabinet. Upon a reverse movement of the wheel 9, the cords 60 and 28 will be retracted, drawing down upon the cabinet against the action of the counterweight 48 and the cords 49 and 36 will be let out to accommodate this downward movement of the cabinet. The counterweight 48 is intended just to counterbalance the weight of the pigeonhole cabinet with the ordinary writing appurtenances.

It will of course be evident that when the top 5 is drawn outward in the position shown in Fig. 2 and the cabinet 23 raised, that a space will be left between the ends of the cabinet and the outer edge of the molding 67 which forms the upper end of the end panel 2. In order to provide means for automatically closing these openings, I have provided the filling pieces or members illustrated in detail in Figs. 8, 9 and 10 and designated 68. Both of these filling pieces are alike, operate in the same manner and hence a description of one is equally applicable to the other.

As shown in Fig. 8, the upper end of the panel 2 is cut away as at 69 or slotted and the upper end of the molding 67 is also slotted to correspond with the slot 69. The floor of this slot is curved downward and inward. Normally disposed in the space immediately behind this cutaway portion of the panel 2 is the filling piece 68 as shown in Fig. 10. This is held in a nearly vertical position as shown in Fig. 10 but when the sliding bureau top 5 has been drawn outward and the pigeonhole cabinet 23 raised, the filling piece 68 will be automatically lifted from a nearly vertical position to a horizontal position so as to fill the space between the rear edge of the sliding top 5 and the base of the adjacent post supporting the mirror as illustrated in Fig. 2. To this end I mount at each end of the space within which the filler 68 is received a slotted plate, one being designated 70 and the other 71. Both of these plates are alike, act in a like manner upon the filling piece 68, and hence a description of one applies to the other. Each of these plates 70 and 71 is slightly curved from its lower end upward and rearward and is formed with a longitudinally extending slot 72 which has the form of a section of a very slight sine curve. The plate 70 is disposed at one end of the space within which the filler 68 moves and the plate 71 is disposed at the other end thereof.

On the under face of the filler 68 at each end thereof is mounted a plate 73 illustrated in Fig. 12, which plate at one portion projects laterally and extends through the slot as at 74 and then extends outward from the butt edge of the filler 68 but parallel to the filling piece so as to form a slightly curved shank 75. This shank 75 is outwardly curved so as to escape the bottom plank or member 23ª of the pigeonhole cabinet. The portion of the shank 75 which passes through the slot 72 is rounded so as to have a rotative bearing against the walls of the slot 72. The outer end of the shank 75 is laterally extended or bent as at 76 for engagement between spaced fingers 77 and 78 which are connected at their inner ends and extend laterally from a bracket 79 attached to and projecting down from the bottom shelf 23ª of the pigeonhole cabinet.

As shown in the Figs. 8, 9 and 10, the finger 78 is less in length than the finger 77, the latter being the bottom finger, and this uppermost finger 78 at its extremity is upwardly curved as at 80. The extremity of the shank 75 is never forced outward so far as to be out of line with the extremity of the finger 77.

When the pigeonhole cabinet is lowered within the desk, the parts are in the position shown in Fig. 10, the filling piece being withdrawn into a position nearly vertical, the rounded portion of the shank 75 being at the bottom of the slot 72 and the shank 75 being inclined downward at an angle with the lower end 76 of the shank bearing against the extremity of the finger 77. It will be understood that this statement applies to both pairs of shanks 75. Now as the pigeonhole cabinet rises, the two pairs of fingers 77 and 78 will also rise and as they rise, the extremity of each shank 74 will ride inward and at the same time the filling piece 68 will fulcrum upon its upper edge, and not only be carried upward but will ride upon the curved inner face 69 and will be turned into the position shown in Fig. 9. As the pigeonhole cabinet reaches its fully elevated position, the angular end 76 of each shank will be at the inner end of the space between the fingers 77 and 78 and the filling piece 68 will be horizontal and flush with the upper surface of the sliding top 5. When the pigeonhole cabinet is lowered, the reverse movement occurs. The shank 75 is carried downward, the filling piece is rocked and slides down over the surface 69 until it arrives at the position shown in Fig. 10.

In Fig. 3 I show another form of my invention which is precisely the same as that previously described, except in this particular, the design as shown in Fig. 3 is for a dresser and at the rear of the top of the dresser at each end thereof are the drawer cases 81. These are so mounted upon the top of the dresser as to permit the sliding top 5ª to slide beneath the forward ends of the drawer cases. When the slide 5ª is pulled outward then to the position shown in Fig. 3, a space will be left between the rear end of the slide and the rear edge of the table. The pigeonhole cabinet 23ᵇ is then raised upward in the manner previously described so that its bottom 23ᶜ is flush with the upper surface of the sliding top 5ª. Inasmuch as the drawer cases are fixed in place, there is nothing to be filled in and hence the filling blocks 68 are not used in this article of furniture. There will remain a space 82 beneath the drawer cases 81 which will not be filled when the sliding top 5ª is drawn outward but this will not be conspicuous nor will it detract from the beauty of the article of furniture. Otherwise than as above described, the construction as shown in Fig. 3 is precisely the same as that shown in Fig. 1, as far as the mechanism for raising and lowering the pigeonhole cabinet is concerned. This pigeonhole cabinet 23ᵇ is formed on its ends 24ª with the grooves or ribs 25ª which engage with grooves or ribs in the wall of the pigeonhole cabinet compartment as previously indicated so as to guide the pigeonhole cabinet and prevent any binding. The forward wall of the pigeonhole cabinet is formed by the panel 83 disposed between the lateral drop drawers 84.

The operation of my invention will be plain from what has gone before. Under normal circumstances, the bureau, for instance, as shown in Fig. 2 looks precisely the same as any other bureau. The pigeonhole cabinet 23 is lowered within its compartment and the sliding top 5 is closed. The molding 6 entirely conceals the wheel 9 and the mechanism whereby the pigeonhole cabinet is operated. Now if it is desired to use the article of furniture as a desk, the cover 5 is drawn outward as illustrated in Fig. 2. At this time the pigeonhole cabinet is lowered. After the cover 5 has been drawn outward, the hand is inserted beneath the cover 5 and the handle 11 is used to turn the wheel 9 in the direction of the arrow, Fig. 4. This as previously explained causes the pigeonhole cabinet to rise and when the handle 11 has reached the stop 13, the pigeonhole cabinet will have been raised to its fully projected position. As the pigeonhole cabinet rises, it turns and forces outward the filling pieces 68 into the position shown in Fig. 8 and in Fig. 2. The article of furniture has then the form presented in Fig. 2. Inasmuch as the sliding top 5 projects beyond the front of the drawers, it is possible to use the sliding top as the top of a desk.

It will be noted that the bottom 23ª of the cabinet 23 may be used to support an inkstand and writing materials and that in order to shift the cabinet it is not necessary to disturb any of the articles supported on the shelf 23ª or within the drawers of the cabinet. Inasmuch as the handle 11 is engaged by the stop clip 13, and further inasmuch as the cabinet 23 is counterweighted by the counterweight 48, the cabinet can not lower under weight and can only be lowered by the positive actuation of the handle 11 by shifting it out of engagement with the stop clip 13 into engagement with the stop clip 12. This reverse movement of the cabinet causes the lowering of the pigeonhole cabinet into place. As soon as this occurs, the top 5 may be slid rearward over the opening of the pigeonhole cabinet and the article of furniture will again assume the appearance illustrated in Fig. 1. What is true of Figs. 1 and 2 is equally true of the construction illustrated in Fig. 3.

It will be noted, of course, that the lower shelf 23ª of the bureau shown in Fig. 2 and the lower shelf 23ᶜ of the dresser shown in Fig. 3 must be brought up flush with the upper surface of the sliding top 5 (or Fig. 5ª) and hence it is necessary to form recesses 85 in the rear edge of the sliding top and the forward edge of the rear cross bar 86 of the dresser or bureau into which the projecting ends of the brackets 79 may extend when the lower shelf 23ª is raised up to bring its top surface flush with the surface of the sliding top 5.

While I have illustrated what I believe to be the best form of my invention, I do not wish to be limited thereto as it is obvious that many changes might be made therein without departing from the spirit thereof.

What I claim is:

1. A convertible article of furniture comprising a body having a vertically arranged compartment, a cabinet vertically movable within said compartment, a rotatable member mounted upon the body to one side of the cabinet-receiving compartment, flexible connections between said rotatable member and the cabinet to effect a lifting of the cabinet when turning the rotatable member in one direction, other flexible connections between the rotatable member and the cabinet to draw the cabinet within its compartment when turning the rotatable member in an opposite direction, direction pulleys for the two sets of flexible connections, and a movable top normally closing the body and extending over and concealing the said rotatable member and the connecting means between it and the cabinet, said top registering with upper and lower shelves of the cabinet when the latter is at the limit of its movement in each direction to close the cabinet-receiving compartment.

2. A convertible article of furniture including a body having a vertically disposed cabinet compartment less in length than said body, a vertically movable cabinet therein, a top having the same length as the body and slidably mounted thereupon, said top normally covering the cabinet compartment but being shiftable outwardly to uncover the same, means for raising and lowering the cabinet, laterally disposed filling pieces movable into and out of position to fill the spaces at the ends of the cabinet and behind the sliding top, and means for raising said filling pieces into a horizontal position when the cabinet is raised and lowering said filling pieces into a vertical position beneath the level of the sliding top when the cabinet is lowered.

3. A convertible article of furniture including a body having a vertically disposed cabinet compartment less in length than said body, a sliding top mounted upon the body and shiftable rearward into position to cover the cabinet compartment or outward to a position to uncover the same, a vertically movable cabinet mounted in the compartment, means disposed beneath the sliding top and operatively connected to the cabinet whereby to vertically raise or lower the same, filling pieces disposed at each end of the body and having each the same length as the depth of the cabinet, and means for shifting said filling pieces as the cabinet is lifted from a vertical position behind the outer walls of the body into the space at the ends of the cabinet and behind the sliding top with their upper faces flush with the upper face of the sliding top.

4. A convertible article of furniture comprising a body formed with a cabinet compartment extending longitudinally of the body, a cabinet disposed within said body, a sliding top mounted upon the body and when closed extending over the cabinet and when opened permitting the cabinet to be raised, a grooved wheel mounted upon the body beneath said top, a flexible connection attached to one portion of the wheel and at its other end attached to one side of the cabinet at the lower end thereof, a flexible connection attached to the opposite portion of the wheel and also attached to the same end of the cabinet, a flexible connection extending oppositely to the first named connection and attached from the same side of said wheel and connected to the opposite end of the cabinet, a flexible connection extending oppositely from the second named flexible connection and to the same side of the wheel and extending to the last named end of the cabinet, and pulleys over which said flexible connections pass whereby upon a rotation of the wheel in one direction the cabinet will be raised and a rotation of the wheel in the opposite direction the cabinet will be lowered.

5. A convertible article of furniture including a body having a cabinet compartment extending longitudinally thereof and adjacent the rear of the body, a fixed top on the body extending from the front of the body to the forward wall of the cabinet compartment, a grooved wheel rotatably mounted upon said top, a second top slidably mounted upon the fixed top and extending over the said wheel and having a depth substantially equal to the depth of the article of furniture, said sliding top being movable outward to disclose the cabinet compartment and being provided at its forward edge with a downwardly extending molding, a cabinet slidably mounted within the cabinet compartment for vertical movement, flexible connections between the grooved wheel and the cabinet to effect the lifting of the cabinet when rotating the wheel in one direction, other flexible connections between the wheel and the cabinet for drawing the cabinet into the said compartment when rotating the wheel in an opposite direction, and guide pulleys for the two sets of flexible connections.

6. A convertible article of furniture including a body having a cabinet compartment extending longitudinally thereof and adjacent the rear of the body, a fixed top on the body extending from the front of the body to the forward wall of the cabinet compartment, an actuating member mounted upon said fixed top, a sliding top slidably mounted upon the first named top and extending over the said actuating member and having a depth equal to the depth of the article of furniture, said sliding top being movable outward to disclose the cabinet compartment, a cabinet slidably mounted within the cabinet compartment for vertical movement, mechanism operatively connected to the cabinet and to said actuating member whereby a rotation of the wheel in one direction will raise the cabinet out of the compartment and a rotation of the actuating member in the opposite direction will lower the cabinet, and a counterweight operatively connected to the cabinet and disposed within said body.

7. A convertible article of furniture including a body having end panels and a fixed top, the body being formed at its rear with a longitudinally extending cabinet compartment, the fixed top extending to the front wall of the cabinet compartment, a slidable top mounted upon the fixed top and movable in one position to cover the cabinet compartment and movable outward to uncover the cabinet compartment, a vertically slidable cabinet disposed within the cabinet compartment, a grooved wheel rotatably mounted upon the fixed top and beneath the slidable top, flexible connections attached to diametrically opposite points of the wheel extending horizontally to one end of the body and connected to the adjacent end piece of the cabinet, pulleys over which said flexible connections pass, flexible connections attached to diametrically opposite points of the wheel and passing to the other end of the body and being there attached to the adjacent end piece of the cabinet, pulleys over which said flexible connections pass, a counterweight, flexible connections from said counterweight to said cabinet, pulleys over which said last named flexible connections pass, the flexible connections passing from diametrically opposite points of the wheel to the same end of the cabinet being reversely arranged so that as one of the flexible connections tighten the other will loosen.

8. A convertible article of furniture including a body formed at its rear with a cabinet compartment less in length than the body, a vertically movable cabinet slidably mounted in said cabinet compartment, a sliding top having the same length as the body and mounted thereon, said top when shifted forward uncovering the cabinet compartment to permit the raising of the cabinet and when shifted rearward covering said cabinet compartment, filling pieces having the same length as the depth of the cabinet and disposed one on each end thereof, slotted supporting members in the slots of which the filling pieces are slidably and rotatably mounted, shanks extending from said filling pieces and having laterally turned terminal ends, and filling piece actuating members disposed at each end of the cabinet at the bottom thereof, each including an upper and a lower finger, the upper finger being less in length than the lower finger and spaced therefrom whereby when the cabinet rises the lower finger will engage the terminal end of the corresponding shank to rotate the corresponding filling piece from a vertical to a horizontal position to fill the space rearward of the slidable top and outwardly of the lower shelf of the cabinet and when the cabinet lowers the upper finger will act to rotate the corresponding filling piece from a horizontal to a vertical position and draw it downward below the slidable top and then escape the terminal end of the corresponding shank.

In testimony whereof I affix my signature in presence of two witnesses.

MAX H. STUEWE. [L. S.]

Witnesses:
 J. E. McLeod,
 John Noske.

Copies of this patent may be obtained for five cents each, by addressing the "Commissioner of Patents, Washington, D. C."